M. D. JONES.

Brackets for Flower-Pots.

No. 5,969. Reissued July 14, 1874.

Witnesses.
Francis E. Fayan.
W. E. Boardman.

M. D. Jones.
F. Curtis Atty.

THE GRAPHIC CO. PHOTO-LITH. 39 & 41 PARK PLACE, N.Y.

UNITED STATES PATENT OFFICE.

MELVILLE D. JONES, OF BOSTON, MASSACHUSETTS.

IMPROVEMENT IN BRACKETS FOR FLOWER-POTS.

Specification forming part of Letters Patent No. 134,751, dated January 14, 1873; reissue No. 5,969, dated July 14, 1874; application filed May 19, 1874.

*To all whom it may concern:*

Be it known that I, MELVILLE D. JONES of Boston, in the county of Suffolk and State of Massachusetts, have invented an Improved Compound Bracket for Plants, &c., of which the following is a specification:

The purpose of this invention is to provide a swinging or changeable bracket for the support of flower-pots, or other objects which shall possess ornament and convenience, the construction of my bracket enabling me to group a number of plants, or other objects, in any desired manner or position, or to change the position of the entire series at pleasure.

My present invention consists in grouping upon or combining with a swinging arm two or more shelves or supports, which are pivoted to the main arm or applied to the auxiliary arms, which are pivoted to the latter, the said main arm being hinged to a plate or base, which is secured to the wall of the apartment in order not only that the entire series of arms may be turned horizontally upon the base, but each arm or support turned independently upon the main arm. By thus combining the auxiliary arms with the main arm or support, I can arrange or group the series in a cluster in such manner that plants may be made to present a very tasteful and ornamental appearance, and I am further enabled by changing the position of each arm independently, to provide for varying sizes of flower-pots, or other objects, which could not be done if the position of each shelf or arm was arbitrary.

Figure 1:
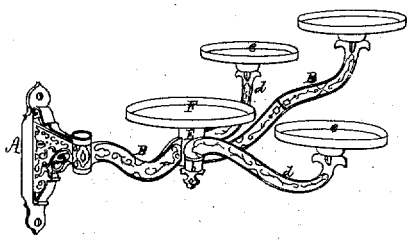
Figure 2:
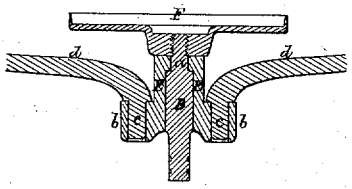

The drawings accompanying this specification represent in Figure 1 a side elevation, and in Fig. 2 a vertical and transverse section, of a compound bracket embodying my improvement.

In these drawings, A represents the base or wall portion of my improved bracket, which base is to be cast in metal in any desired desired design, and is to be affixed to the wall of an apartment, or in other localities, in the usual manner of applying such articles, the said base A constituting the main support of the other portions of the bracket. B, in the drawings, represents an arm pivoted at one end to the base and departing horizontally therefrom. In carrying out my invention I pivot, in any suitable manner, to the arm or support B two or more auxiliary arms or supports, *d d*. The joint which I have shown in the present instance, in illustration of my invention, as existing between the said arms *d d* and support B is thus explained. Upon the top of the arm B I erect a post or tenon, *a*, while encompassing or straddling this post is a tubular block or saddle, E. This saddle E is formed upon one or both sides, with an upright socket, *b*, to receive a tenon, *c*, which constitutes the lower termination of a branch or auxiliary arm, *d*, while to the outer end of this arm I affix a shelf, *e*, or its equivalent, for supporting a flower-pot, or other object, and permitting the latter to be swung about and changed in position at pleasure. To economize space and to add to the ornamental appearance of the bracket, I affix to the top of the post *a*, which projects above the saddle E, a shelf, F.

By grouping upon one arm a cluster of auxiliary arms, as hereinbefore explained, very pleasing effects may be produced and an object of great utility and convenience obtained, as the positions of the various shelves may be adjusted individually, as taste dictates, by turning each upon the support B in order to produce various changes or to accommodate the varying sizes of pots or other objects.

I claim—

A bracket or movable support for plants, &c., consisting of a swinging arm pivoted to a suitable base, in combination with two or more auxiliary arms or supports hinged or pivoted to this main arm, substantially as and for purposes stated.

MELVILLE D. JONES.

Witnesses:
F. CURTIS,
W. E. BOARDMAN.